United States Patent [19]
Frankel

[11] 3,928,231

[45] Dec. 23, 1975

[54] SELECTIVE HYDROCARBOXYLATION OF UNSATURATED FATTY COMPOUNDS

[75] Inventor: Edwin N. Frankel, Peoria, Ill.

[73] Assignee: The United States of America as represented by the Secretary of Agriculture, Washington, D.C.

[22] Filed: Nov. 15, 1973

[21] Appl. No.: 416,122

Related U.S. Application Data

[62] Division of Ser. No. 295,747, Oct. 6, 1972, abandoned.

[52] U.S. Cl............. 252/413; 252/414; 252/429 R; 260/410.7; 260/410.9 R; 260/485 R; 260/537 R; 260/537 N
[51] Int. Cl.² .................. B01J 27/32; B01J 31/40; C11C 3/00; C07C 55/00
[58] Field of Search .... 260/537 R, 533 A, 533 AM, 260/429 R, 497 B, 514 M, 413, 398, 410.7, 410.9 R, 485 R, 537 R; 252/413, 414

[56] References Cited
UNITED STATES PATENTS

| 2,801,263 | 7/1957 | Hasek et al. ................ 260/537 R |
| 3,020,314 | 2/1962 | Alderson .................... 260/533 AM |
| 3,168,553 | 2/1965 | Slaugh ....................... 260/533 AM |
| 3,420,873 | 1/1969 | Olivier....................... 260/497 B |
| 3,437,676 | 4/1969 | Kutepow et al. ............ 260/533 AM |
| 3,501,518 | 3/1970 | Kutepow et al. ............ 260/533 AM |
| 3,547,964 | 12/1970 | Olivier ....................... 260/429 R |
| 3,641,076 | 2/1972 | Booth .......................... 260/429 R |
| 3,793,369 | 2/1974 | Hara et al. ................. 260/497 B |

Primary Examiner—Winston A. Douglas
Assistant Examiner—P. E. Konopka
Attorney, Agent, or Firm—M. Howard Silverstein; Max D. Hensley; David G. McConnell

[57] ABSTRACT

An improved process is described for preparing carboxy acid products in high yields by reacting without isomerization unsaturated vegetable oil material with carbon monoxide and water in the presence of a highly selective catalyst system.

1 Claim, No Drawings

SELECTIVE HYDROCARBOXYLATION OF UNSATURATED FATTY COMPOUNDS

A nonexclusive, irrevocable, royalty-free license in the invention herein described, throughout the world for all purposes of the United States Government, with the power to grant sublicenses for such purposes, is hereby granted to the Government of the United States of America.

This is a division of application Ser. No. 295,747, filed Oct. 6, 1972, now abandoned.

BACKGROUND OF THE INVENTION

This invention relates to the carboxylation (carbonylation) of olefinically unsaturated compounds. More specifically, it relates to the hydrocarboxylation of unsaturated fatty compounds in the presence of a highly selective catalyst system, resulting in products having substantially all added carboxyl groups attached to one of the originally unsaturated carbon atoms in the unsaturated fatty compound starting material. The term "fatty compounds" will be understood to mean any triglyceride oil, free fatty acids, fatty alkyl esters (e.g., methyl oleate), or other derived fatty materials.

Carboxylation has long been known as a process for introducing oxygen functionality into olefinic compounds by their reaction with carbon monoxide and water in the presence of metal carbonyl catalysts, usually nickel carbonyl [W. Reppe and H. Kröper, German Pat. No. 861,243 (1952)]. The use of such catalysts requires elevated pressures of up to 200 atmosphere and temperatures of up to 270° C. which result in side reactions lowering the yield of carboxy acid products. Isomerization of olefinic unsaturation to a large number of internal carbon positions of the olefinic compound is a particularly troublesome side reaction resulting in a very complex isomeric mixture of branched carboxy acid products. The carboxylation of long chain fatty acid compounds (e.g., those having 18 carbon atoms) by conventional catalysts such as nickel carbonyl results in a large number of isomers with carboxy acid branches located throughout the C-18 fatty acid chain.

More recently, Bittler et al., Angew. Chem. Internat. Edit. 58l, 1 (1968) and Kutepow et al. (U.S. Pat. No. 3,437,676) carbonylated unsaturated compounds to prepare esters in the presence of various palladium complexes, hydrogen chloride, and alcohols. High yields of carboxy ester products were obtained from simple olefinic hydrocarbons, but product yields were relatively low when reactions were attempted with more complex oxygen-containing olefinic compounds. Results of fractional distillations of these products indicated substantial formation of undesirable side products.

The application of these carboxylated derivatives prepared by prior art catalytic carboxylation in various polymer applications such as in alkyl resins, polyesters, and polyamides result in products with an undesirably wide range of properties because of the great number of branched isomers present in the starting materials. There has existed a need for the preparation of oxygenated derivatives of long chain fatty compounds with only a small number of isomers to permit the preparation of polymers with more uniform, homogeneous, and predictable properties and hence, much more useful than the known polymers that can be made from the mixture of a large number of oxygenated isomers now available from prior art hydrocarboxylation and carboxylation.

A principal object of this invention is the provision of a direct process for converting predominantly monounsaturated fatty compounds into carboxy acid products by the use of a highly selective hydrocarboxylation catalyst system which prevents the isomerization of the double bond and consequently results in the preparation of isomers with carboxy acid groups attached only to the original unsaturated carbon atoms of the fatty acid radical. A more specific object is to add carboxyl functionality to oleic acid derivatives without isomerization of the natural 9–10 double bond and therefore to give a mixture of only two carboxy acids consisting of the 9- and 10-carboxy acid or ester.

In accordance with the objects of the invention, I have discovered an improved process of adding carboxyl groups to unsaturated compounds comprising reacting unsaturated fatty compounds, such as mono- and polyunsaturated free fatty acids and esters, and triglyceride vegetable oils, with carbon monoxide at pressures of from about 3000 to 4500 p.s.i.g., and a 10 to 100 mole percent excess of a stoichiometric amount of water in the presence of catalytic amounts of palladium chloride admixed with a trisubstituted phosphine in molar ratios of from 1:2 to 1:4, palladium chloride:-trisubstituted phosphine, at temperatures of from 100° to 160° C. The reactions were carried out for a period of time sufficient to achieve maximum yields of product. Surprisingly, the carboxylated products were produced in conversion yields (defined in footnote 2, Table 1, infra) of from about 86 to 99 mole percent, and the products were characterized as having substantially all of the added carboxyl groups attached to one of the originally unsaturated carbon atoms in the unsaturated fatty compounds.

The improved selective hydrocarboxylation process for monounsaturated fatty compounds provides a more efficient route to 9(10)-carboxystearic acid and esters than the prior art two-step process involving selective hydroformylation to produce 9(10)-formylstearic acid and esters followed by oxidation of this product to 9(10)-carboxystearic acid and esters [Frankel, J. Amer. Oil Chem. Soc. 48: 248 (1971)]. Catalytic oxidation of methyl 9(10)-formylstearate is not only slow, but yields of carboxystearate esters are lowered by the formation of side products such as methyl stearate, methyl hydroxystearate, methyl ketostearate, and methyl epoxystearate [Schwab et al., J. Amer. Oil. Chem. Soc. 49: 75 (1972)]. The 9(10)-carboxystearate product obtained directly in one step by the instant improved hydrocarboxylation process is free of those oxidation side products and, therefore, it is of both higher functional and isomeric purity than the carboxystearate product made by the two-step hydroformylation and oxidation process of oleic acid and esters.

I also discovered a process for reactivating the spent hydrocarboxylation catalyst comprising distilling the carboxylated fatty products prepared as described above at temperatures of from about 135° to 220° C. and pressures of from 0.02 to 0.01 mm. of mercury in such a manner that from about 93 to about 95 percent by weight of the carboxylated fatty products are distilled, leaving a pot residue. The pot residue is oxidized with concentrated nitric acid, dissolved in water, extracted, neutralized, and dried. A reaction of unsaturated fatty compound with carbon monoxide and water was conducted as described above in the presence of a catalytic amount of the oxidized pot residue admixed with a trisubstituted phosphine and hydrogen chloride in weight ratios of 1:0.2:0.02 to about 1:3:0.06, pot residue:trisubstituted phosphine:hydrogen chloride, to produce the same carboxylated products as described above in conversion yields of from about 94 to 99 mole percent.

I also discovered that a catalyst comprised of 10 percent metallic palladium deposited on carbon admixed with a trisubstituted phosphine and hydrogen chloride in molar ratios of from about 1:2:1 to 1:4:6, palladium:trisubstituted phosphine:hydrogen chloride, catalyzes the hydrocarboxylation reaction in the same manner as the palladium chloride and pot residue catalyst systems to produce the same carboxylated fatty compounds described above in conversion yields of from about 88 to 99 mole percent.

The carboxylated fatty acids, esters, and triglycerides prepared by the process of this invention are useful in the manufacture of alkyl resins, polyamides, polyesters, and other polymer applications; or, when fully esterified, they are useful as plasticizers and as synthetic lubricants. Since the products are simple mixtures containing carboxyl groups only on originally unsaturated carbons, they are more useful than the more complex carboxylated products described in the prior art which contain large numbers of isomeric acids. For example, products containing essentially 9- and 10-carboxystearic acids are prepared from oleic acid and are solid and crystalline at room temperature and are therefore valuable in producing desirably higher melting solid polymers.

DETAILED DESCRIPTION OF THE INVENTION

Carboxylation reactions include four critical ingredients: an unsaturated compound, a nucleophilic hydrogen donor, carbon monoxide, and a catalyst. When unsaturated fatty compounds are chosen for the starting materials, the major problems to overcome are low yields and significant isomerization. The improved process of this invention overcomes both of these problems.

Examples of unsaturated fatty compounds which are useful in the practice of the instant invention include oleic, linoleic, and linolenic acids, esters and their glycerol esters, triglyceride oils containing unsaturated fatty acids such as soybean oil, olive oil, safflower oil, linseed oil, animal fats, and fish oils. The many equivalents to the above unsaturated fatty compounds will be known to those skilled in the art. Ester groups which can be attached to the original carboxyl group of the fatty compounds include the lower alkyls and any other ester group which will not poison the catalyst or sterically hinder the reaction.

Nucleophilic hydrogen donors described in prior art carboxylation reactions have usually included alcohols, such as methyl or ethyl alcohols and phenols, and water. However, in the instant process, the presence of alcohols reduced the yield of carboxylated product (e.g., Example 25, infra) while the use of water provided conversion yields as high as 99 mole percent. Although water reacts with the carbon monoxide and a unit of unsaturation in a mole-per-mole basis, it is preferred that water be present in a 10 to 100 percent excess of the stoichiometric amount. Water present in quantities above a 100 percent excess, for reasons not completely understood, has the effect of decreasing product yields. Carbon monoxide pressures also show a somewhat critical range. At pressure of from 3000 p.s.i.g. to 4500 p.s.i.g., the products from oleic acid contain from 87 to 94 mole percent 9- and 10-carboxystearic acid, while at a pressure of 2000 p.s.i.g. (other conditions the same) the reaction produced a product containing only 75 mole percent 9- and 10-carboxystearic acid, the remaining 25 percent being a variety of positional isomers from C-8 to C-13. Therefore, a carbon monoxide pressure range of from 3000 to 4500 p.s.i.g. is preferred. The upper limit is not critical to the reaction per se.

The preferred catalyst system includes the ingredients of palladium chloride and triphenylphosphine in molar ratios of from about 1:2 to 1:4, palladium chloride:triphenylphosphine, which are mixed in situ with the starting material and water. Catalysts in the examples were present in quantities ranging from 0.25 to 0.1 mole percent based on amount of unsaturated fatty compound. When palladium chloride is present in the catalyst system, the results of the carboxylations are as good or better when no hydrogen chloride is added to the reaction mixture than the results of reactions containing added hydrogen chloride as is generally the case in prior art carboxylations. Other palladium compounds such as palladium acetate and palladium bisacetylacetonate will also produce the carboxylated fatty products but only in the presence of added hydrogen chloride. Other trisubstituted phosphine compounds which are useful in the instant process include triethyl-, tributyl-, and other trialkylphosphines.

There were two other catalyst systems that produced the desired carboxylated compounds in high yields. They would be especially useful for continuous operations. The first system was a 10 percent (by weight) metallic palladium deposited on carbon-triphenylphosphine-hydrogen chloride mixture having ratios of ingredients from about 1:2:1 to 1:4:6, palladium: triphenylphosphine:hydrogen chloride. The second system used a reactivated pot residue prepared by vacuum distilling the products of the instant reaction conducted in the presence of a palladium chloride-triphenylphosphine catalyst. Distillations, preferably at temperatures of from 135° to 220° C. and reduced pressures of from 0.02 to 0.01 mm. of mercury, left pot residues which were 3 percent to 9 percent of the total weight of product. These pot residues were then oxidized with concentrated nitric acid, extracted, neutralized, and dried. The instant carboxylation reaction was conducted in the presence of a mixture of oxidized pot residue, triphenylphosphine, and hydrogen chloride in weight ratios of from about 1:0.2:0.02 to 1:3:0.06.

Solvents may be used in the reaction if they do not interfere with the reaction or cause side reaction problems. Alkaline solvents such as N,N'-dimethylformamide poison the catalyst. Acetone and acetic acid are suitable solvents and have a beneficial effect on yield, especially acetic acid.

In the preferred process unsaturated fatty products are mixed with the catalyst system and water and with solvent, if used, in a pressure vessel which is subsequently charged with carbon monoxide at pressures of from 3000 to 4500 p.s.i.g. The reaction mixture is then heated to a temperature of from 120° to 160° C. and held until no more carbon monoxide is taken up indicating the end of the reaction. This was from about 4 to 12 hours. The crude product was in some examples purified by vacuum distillation.

It should be understood by anyone skilled in the art that parameters of time, temperature, pressure, and quantity of catalyst can be varied to a considerable extent. For example, a pressure of 4500 p.s.i.g. is specified as being preferred only because of pressure limitations of the reaction vessel. If a higher pressure were used, the other parameters would have different limits. Therefore, the invention should not be limited to the parameters disclosed in the discussion above or in the examples unless the parameter is specified as being critical.

Hydrocarboxylation by the instant method of oleic acid or methyl oleate converts substantially all of the unsaturation of the fatty components into only carboxystearic acid or ester and most unexpectedly without inducing isomerization of the double bond to permit the essentially exclusive formation of the 9- and 10-carboxystearic acid or ester. Diunsaturated linoleic and triunsaturated linolenic acid esters in vegetable oils such as safflower and linseed oils are also effectively hydrocarboxylated with the palladium chloride and triphenylphosphine catalyst system described in the instant invention. Linoleic acid in safflower oil fatty acids was converted into a mixture of carboxyoleic acid and dicarboxystearic acid (Example 28, infra). Linolenic acid in linseed oil fatty acids was converted into a mixture of carboxylinoleate and into other polycarboxy acids (Example 29, infra). Vegetable oils such as soybean oil and linseed oil which contain both linoleic and linolenic acid as main constituents are effectively hydrocarboxylated with the palladium chloride and triphenylphosphine catalyst system. The polyunsaturation of these vegetable oils was converted into high yields of products containing one or more carboxy acid groups and residual unsaturation.

For various polymer applications it is often desirable to prepare carboxyl products which have a certain amount of unsaturation. Such unsaturated carboxyl products have dual functionality which is extremely useful for polymerization. By the process described in the instant invention it is possible to carry out a partial hydrocarboxylation by stopping the catalytic reaction at any desired degree of conversion by simply cooling rapidly the reaction vessel to a temperature at which the palladium and triphenylphosphine catalyst system is no longer active. By this process of partial hydrocarboxylation highly useful carboxy acid products can be thus prepared with a controlled degree of unsaturation and such products are tailor-made for various polymer applications.

The various compounds produced by the instant process are exemplified by the following structures:
monocarboxystearic acid or ester,

where $w + z = 15$;
monocarboxyoleic acid or ester,

or

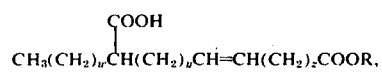

where $w + y + z = 13$;
monocarboxylinoleic acid or ester,

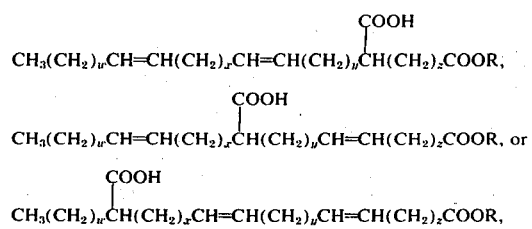

where $w + x + y + z = 11$; and where $R = H$, alkyl, or diacycloxypropyl.

Polycarboxy acids and esters are also formed as exemplified by the following structures:
dicarboxystearic acid or ester,

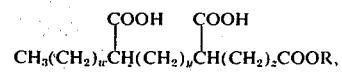

where $w + y + z = 14$;
dicarboxyoleic acid or ester,

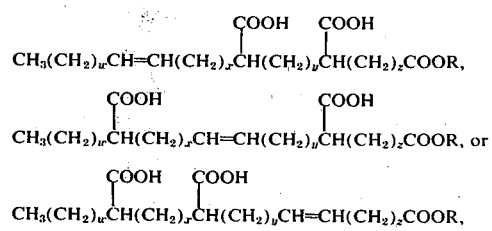

where $w + x + y + z = 12$;
tricarboxystearic acid or ester,

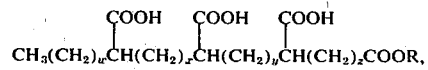

where $w + x + y + z = 13$; and $R = H$, alkyl, or diacycloxypropyl.

The above structures are to be considered examples and should not be construed as limiting the scope of the invention. Other unsaturated fatty compounds having different chain lengths and positions of unsaturation give comparable products when treated by the instant process.

The following specific embodiments are intended only to further illustrate the invention as defined by the claims.

EXAMPLE 1

A 300-ml. autoclave made of acid-resistant Hasteloy C stainless steel was charged with the catalyst consisting of 0.300 g. palladium chloride (0.5 mole percent of the fatty acid unsaturation) and 1.766 g. of triphenylphosphine (2.0 mole percent of the fatty acid unsaturation), together with 7.74 g. distilled water (10 mole percent excess of the fatty acid unsaturation). To this mixture was added 100.2 g. of commercial distilled oleic acid of 94 percent purity as determined by gas-liquid chromatography (GLC) (0.334 mole) and 50 ml. acetone used as a solvent. The autoclave was sealed, purged 3 times with approximately 200 p.s.i.g. of carbon monoxide, and then pressurized with the same gas to 2900 p.s.i.g. The vessel was agitated magnetically. Heat was applied and after 15 minutes the temperature reached 150° C. During this period the pressure reached 3800 p.s.i.g. and was increased to 4000 p.s.i.g. The temperature was controlled at 150° ± 1° C. for 2 hours and 20 minutes. During this time the pressure declined to 3500–3000 p.s.i.g. and was restored repeatedly to 4000 p.s.i.g. until it remained essentially constant at 3995–4000 p.s.i.g. The autoclave and contents were cooled to room temperature and the gas was vented. The contents were removed and transferred with acetone and the solution was stored overnight at 0°–5° C. The reaction mixture in acetone solution was filtered through Whatman No. 1 paper. The acetone solvent was removed from the product by water aspirator followed by mechanic pump vacuum. The pale yellow product weighed 114.1 g. and contained 93.5 percent 9(10)-carboxystearic acid as analyzed by GLC after methylation with diazomethane. The weighed product (0.325 mole) represents a 96.4 mole percent yield based on the oleic acid content in the starting material and a 99.5 percent conversion yield. Fractional distillation of the reaction product yielded the following fractions:

| Fraction | Temp., °C. | P., mm. Hg | Weight, g. | Carboxystearic acid, % |
|---|---|---|---|---|
| 1 | 155–170 | 0.02 | 5.5 | 44.9 |
| 2 | 204–210 | 0.01 | 44.8 | 96.8 |
| 3 | 201–210 | 0.01 | 43.4 | 96.8 |
| 4 | 209–210 | 0.01 | 12.6 | 91.3 |
| Residue | | | 5.3 | |

Distillation fractions 2 and 3 were identified as essentially all 9(10)-carboxystearic acid by comparison with a known standard mixture after conversion to the methyl 9(10)-carbomethoxystearate and analyzed by mass spectrometry. Mass spectral analysis showed two intense peaks of mass 200 and mass 186 corresponding to fragments [$CH_3—(CH_2)_8—CH—COOCH_3+H$] and [$CH_3—(CH_2)_7—CH—COOCH_3+H$] of a standard mixture of methyl 9- and 10-carbomethoxystearate. Analysis standardized with a known mixture of synthetic methyl 9- and 10-carbomethoxystearate gave a value of 90 percent for these two isomers.

EXAMPLE 2

Example 1 was repeated with another batch of the same commercial oleic acid under similar reaction conditions except that no acetone was used as solvent. The 300-ml. autoclave was charged with 0.35 g. palladium chloride, 1.8 g. triphenylphosphine, 8.0 g. distilled water, and 101 g. commercial oleic acid of 94 percent purity. The sealed autoclave was purged and then pressurized with carbon monoxide to 2075 p.s.i.g. Heat was then applied with magnetic stirring and the temperature reached 150° within 10 minutes. The pressure reached 2650 p.s.i.g. and was then increased with carbon monoxide to 400o p.s.i.g. The temperature was maintained at 150° ± 1° C. for 4 hours and during this period the pressure decreased to 3700–3900 p.s.i.g. and was restored repeatedly to 4000 p.s.i.g. until it remained essentially constant at 4000 p.s.i.g. The autoclave and contents were cooled to room temperature and the gas was vented. The contents were removed and treated by the same procedure as in Example 1 to yield a crude pale yellow product weighing 112 g. which contained 93.3 percent 9(10)-carboxystearic acid (by GLC) and represented a yield of 94.4 mole percent based on the oleic acid content in the starting material and a 99.2 percent conversion yield. Fractional distillation of 108 g. of crude product at 201°–217° C. and 0.01 mm. Hg pressure yielded 70 g. of carboxystearic acid of 98 percent purity. Other fractions weighing a total of 32 g. varied in purity from 80 to 94 percent carboxystearic acid.

EXAMPLES 3–17

Examples 3–17 were carried out to determine the effect of palladium chloride-triphenylphosphine ratio, the temperature, pressure, and water. A 300-ml. autoclave was charged with 32 g. of olive oil fatty acids containing 81.3 percent oleic acid as determined by GLC. Varying amounts of palladium chloride, triphenylphosphine, and water were added and the mixture was made up to a volume of 100 ml. with acetone. Reaction conditions of temperature, carbon monoxide pressure, and time were varied. The pertinent data, GLC, and mass spectral analysis of the filtered products are set out in Table 1.

Table 1

| Example | Palladium chloride, mole % | Triphenyl-phosphine, mole % | Water, mole % excess | Reaction temp., °C. | Carbon monoxide, p.s.i.g. | Reaction time, hours | Carboxy-stearic acid, %[1] | Conversion yield, %[2] | 9(10)-Carboxy-stearic acid, %[3] |
|---|---|---|---|---|---|---|---|---|---|
| 3 | 0.5 | 0.5 | 10 | 140 | 4000 | 12 | 55.5 | 68.3 | — |
| 4 | 0.5 | 1.0 | 10 | 140 | 4500 | 12 | 69.7 | 85.8 | 91.2 |
| 5 | 0.5 | 2.0 | 10 | 140 | 4500 | 10 | 77.1 | 94.9 | 90.7 |
| 6 | 1.0 | 2.0 | 10 | 140 | 4250 | 4 | 80.8 | 99.4 | — |
| 7 | 1.0 | 4.0 | 10 | 140 | 4025 | 4 | 79.0 | 97.2 | 89.2 |
| 8 | 0.5 | 2.0 | 10 | 150 | 4000 | 6 | 78.6 | 96.8 | 87.4 |
| 9 | 0.5 | 2.0 | 10 | 160 | 4000 | 6 | 72.9 | 89.8 | 84.2 |
| 10 | 1.0 | 4.0 | 10 | 140 | 2000 | 6 | 74.4 | 91.6 | 74.6 |
| 11 | 1.0 | 4.0 | 10 | 140 | 3000 | 6 | 76.3 | 93.9 | 90.1 |
| 12 | 0.5 | 2.0 | 20 | 150 | 4050 | 6 | 78.0 | 96.0 | — |
| 13 | 0.5 | 2.0 | 100 | 150 | 4000 | 6 | 75.1 | 92.4 | 87.9 |
| 14 | 0.5 | 2.0 | 200 | 150 | 4100 | 6 | 72.2 | 88.8 | 88.3 |
| 15 | 1.0 | 4.0 | 0 | 140 | 4100 | 6 | 73.3 | 90.2 | — |
| 16 | 1.0 | 4.0 | 20 | 140 | 4000 | 4 | 74.1 | 91.2 | — |

Table 1-continued

| Example | Palladium chloride, mole % | Triphenyl-phosphine, mole % | Water, mole % excess | Reaction temp., °C | Carbon monoxide, p.s.i.g. | Reaction time, hours | Carboxy-stearic acid, %[1] | Conversion yield, %[2] | 9(10)-Carboxy-stearic acid, %[3] |
|---|---|---|---|---|---|---|---|---|---|
| 17 | 1.0 | 4.0 | 40 | 140 | 4100 | 6 | 73.2 | 90.1 | 90.0 |

[1]Content of crude product by GLC.
[2]Conversion yield calculated as: % carboxy compound in product ÷ % unsaturated fatty compound in starting material ×100.
[3]Percent of total carboxystearic produced as determined by mass spectral analysis.

Referring to Examples 3–7 in Table 1, it is evident that at an optimum ratio of palladium chloride and triphenylphosphine ranging from 1:2 to 1:4 the percent conversion of oleic acid to carboxystearic acid varies from 94.9 to 99.4. Examples 5, 8, and 9 show that higher conversions of 94.9 and 96.8 percent are obtained at 140° C. and 150° C. than at 160° C. Examples 7, 10, and 11 show that a higher yield is obtained at carbon monoxide pressure of 4025 p.s.i.g. and at 3000 than at 2000 p.s.i.g. When palladium chloride and triphenylphosphine are used at respective concentrations of 0.5 and 2 mole percent, higher yields of carboxystearic acid are obtained with a 10 to 20 mole percent excess of water than with a 100 to 200 mole percent excess of water (Examples 8, 12, 13, 14). When palladium chloride and triphenylphosphine are used at respective concentrations of 1.0 and 4 mole percent, the highest yield of carboxystearic acid of 97.2 percent was obtained with a 10 mole percent excess of water (Examples 7, 15, 16, and 17). Example 10 shows that at low pressure 2000 p.s.i.g., there is a higher degree of isomerization resulting in a corresponding lower yield of 9(10)-carboxystearic acid.

EXAMPLES 18–20

Examples 18–20 were carried out to determine the effect of hydrochloric acid on the hydrocarboxylation of oleic acid catalyzed by palladium chloride and triphenylphosphine. A 300-ml. autoclave was used with a charge of 32 g. of olive oil fatty acids containing 81.3 percent oleic acid, 1 mole percent palladium chloride, based on oleic acid, 4 mole percent triphenylphosphine based on oleic acid, a mixture of varying amounts of concentrated hydrochloric acid and water calculated so that a 10 mole percent excess of water is present and acetone solvent to a total volume of reaction mixture of 100 ml. The reaction conditions and GLC analyses of filtered products are set out in Table 2. The results in Table 2 show that 86.0 and 86.2 percent conversion of oleic acid to carboxystearic acid is obtained at 100° C. in 12 hours in the presence of 1 and 2 percent hydrogen chloride. By increasing the temperature to 110° C. the conversion yield decreased to 67.0 (Example 20). The results of Examples 18–20 demonstrate that small amounts of hydrochloric acid permit the use of lower reaction temperatures but the conversion yields of oleic acid to carboxystearic acid are low and the reaction periods are long.

Table 2

| Example | Hydrogen chloride, % | Reaction temp., °C | Carbon monoxide, p.s.i.g. | Reaction time, hours | Carboxy-stearic acid, %[1] | Conversion yield, %[2] |
|---|---|---|---|---|---|---|
| 18 | 1 | 100 | 4100 | 12 | 69.9 | 86.0 |
| 19 | 2 | 100 | 4000 | 12 | 70.0 | 86.2 |
| 20 | 1 | 110 | 4000 | 12 | 54.4 | 67.0 |

[1,2]See Table 1 for explanation.

EXAMPLES 21–23

Examples 21–23 were carried out to determine the effect of glacial acetic acid as a solvent on the hydrocarboxylation of oleic acid catalyzed by palladium chloride and triphenylphosphine. A 300-ml. autoclave was used with a charge of 32 g. of olive oil fatty acids containing 81.3 percent oleic acid as determined by GLC. Varying amounts of palladium chloride, triphenylphosphine, and a 10 mole percent excess of water were added. The reaction mixture was made up to a volume of 100 ml. with glacial acetic acid as solvent. The reaction conditions and gas chromatographic analyses of filtered products are set out in Table 3.

Table 3

| Example | Palladium chloride, mole % | Triphenyl-phosphine, mole % | Reaction temp., °C | Carbon monoxide, p.s.i.g. | Reaction time, hours | Carboxy-stearic acid, %[1] | Conversion yield, %[2] |
|---|---|---|---|---|---|---|---|
| 21 | 0.5 | 2 | 140 | 4000 | 4.5 | 75.7 | 93.1 |
| 22 | 0.25 | 1 | 140 | 4000 | 6 | 75.9 | 93.4 |
| 23 | 0.25 | 1 | 130 | 4125 | 6 | 79.0 | 97.2 |

[1,2]See Table 1 for explanation.

The results in Table 3 show that the use of acetic acid as solvent accelerated the rate of hydrocarboxylation (Example 21). With acetic acid solvent very good conversion yields of carboxystearic acid are obtained at lower catalyst concentration and temperature (Examples 22–23) than with acetone solvent (Example 8, supra).

EXAMPLE 24

A 300-ml. autoclave was charged with 32 g. of olive oil fatty acids containing 81.3 percent oleic acid, 1.100 g. 10 percent palladium on carbon, 0.525 g. triphenylphosphine, 2.10 g. of a solution of water containing 10 percent hydrogen chloride, and 64 g. of acetone. The autoclave was sealed, purged three times, and pressurized with carbon monoxide to 2100 p.s.i.g. The vessel was agitated magnetically and heat applied. The temperature reached 140° within 15 minutes and the pressure increased to 4000 p.s.i.g. The temperature was controlled at 140° ± 1° C. for a period of approximately 6 hours. During the reaction period three samples were taken to follow the progress of the reaction. Each time the pressure decreased to 3500 to 3800 p.s.i.g., the carbon monoxide pressure was restored to 4000 p.s.i.g. The autoclave and contents were cooled to room temperature and the gas vented. The contents were transferred with acetone and filtered as described in Example 1. The crude filtered product weighed 33.5 g. and contained 79.2 percent carboxystearic acid as determined by GLC and representing a conversion yield of 97.4 percent. Example 24 was repeated under identical conditions except that 0.1 or 0.05 percent hydrogen chloride was used. The respective crude products obtained after a reaction period of 12 hours contained 72.9 and 72.0 percent carboxystearic acid as determined by GLC, giving conversion yields of 89.7 and 88.6 percent, respectively. When Example 24 was repeated again under identical conditions, but without hydrochloric acid being used, the product obtained after 6 hours contained only 5.4 percent carboxystearic acid. These results show that the 10 percent palladium supported on carbon and triphenylphosphine mixture is an active catalyst for the conversion of oleic acid to carboxystearic acid only in the presence of hydrochloric acid at concentrations of at least 0.1 to 0.2 percent of the reaction mixture.

EXAMPLE 25

A 300-ml. autoclave was charged with 33.6 g. of olive oil fatty acid methyl esters containing 81.1 percent methyl oleate as determined by GLC, 0.186 g. of palladium chloride, 1.100 g. of triphenylphosphine, 3.50 g. of methanol, and 62 g. of acetone. The autoclave was sealed, purged 3 times, and pressurized with carbon monoxide to 2000 p.s.i.g. Agitation was started and heat applied. After 14 minutes the temperature reached 140° and the pressure was 2600 p.s.i.g. Carbon monoxide pressure was applied to obtain 4000 p.s.i.g. and the temperature was controlled at 140° ± 1° C. for 12 hours. During this period six samples were taken for analyses to follow the progress of the reaction. At the end of the reaction period, the autoclave and contents were cooled to room temperature and the gases were vented. The contents of the autoclave were filtered by the same procedure as given in Example 1. The crude filtered product weighed 36 g. and contained 61.7 percent methyl carbomethoxystearate as determined by GLC and representing a conversion yield of 76.1 percent based on the methyl oleate in the starting material.

EXAMPLE 26

A 300-ml. autoclave was charged with 105 g. of distilled methyl esters of commercial oleic acid containing 0.1 mole of methyl oleate as determined by GLC. To this charge was added 0.297 g. palladium chloride, 1.769 g. triphenylphosphine, 7.740 g. distilled water, and 65 ml. of acetone. The autoclave was sealed, purged 3 times, and pressurized with carbon monoxide to 3000 p.s.i.g. The magnetic stirrer was started and heat was applied. After 20 minutes the temperature reached 150° C. and the pressure increased to 4200 p.s.i.g. The temperature was controlled at 150° ±2° C. for 3 hours. During this period the pressure decreased to a range of 3750–3900 p.s.i.g and was restored four times to 4000 p.s.i.g. until no further gas uptake occurred. The autoclave and contents were cooled to room temperature and the gases vented. The contents were filtered by the procedure described in Example 1. The crude product weighed 119.2 g. and contained 90.1 percent methyl carboxystearate as determined by GLC. Vacuum distillation at a pressure of 0.01 mm. Hg of the crude product (115.8 g.) yielded the following fractions:

| Fraction | Temperature, °C. | Weight, g. | Methyl carboxystearate, % |
|---|---|---|---|
| 1 | 137–149 | 17.0 | 78.0 |
| 2 | 178–184 | 59.7 | 96.0 |
| 3 | 184–185 | 18.9 | 99.6 |
| 4 | 192–217 | 10.1 | 85.6 |
| Pot residue | | 10.1 | |

Fraction 3 was identified as methyl 9(10)-carboxystearate by comparison of its thin-layer chromatogram with that of an authentic sample and by mass spectral analysis.

EXAMPLE 27

In this example the distillation pot residue from Example 26 is oxidized with nitric acid and used as the catalyst for hydrocarboxylation of oleic acid. The pot residue was oxidized by the following procedure: a weighed portion of the pot distillation residue (7.0 g.) was oxidized by stirring with 50 ml. concentrated nitric acid at room temperature for 10 minutes. The acid mixture was mixed with about 50 ml. ice water and extracted with diethyl ether. The ether extract was washed to neutrality and dried over sodium sulfate. The oxidized pot residue obtained after removal of the ether solvent was a viscous light brown oil and weighed 6.6 g. Hydrocarboxylation with this oxidized pot residue was carried out by charging a 300-ml. autoclave with 32 g. of olive oil fatty acids containing 84.6 percent oleic acid, 2.6 g. oxidized pot residue from Example 26, 0.5 g. triphenylphosphine, 2 ml. of a solution containing 2.5 percent hydrogen chloride, and 60 ml. acetone. The autoclave was sealed, purged three times, and pressurized with carbon monoxide to 3175 p.s.i.g. Agitation was started and heat applied. After 12 minutes the temperature reached 140° and the pressure was 4450 p.s.i.g. The temperature was controlled at 140° ± 1° C. for 12 hours. During this period three samples were taken for analyses to follow the progress of the reaction and the pressure varied in the range of 3925 to 4450 p.s.i.g. At the end of the reaction period, the autoclave and contents were cooled to room temperature and the gases were vented. The contents of the autoclave were filtered by the same procedure as given in Example 1. The crude filtered product weighed 35.3 g. and contained 83.6 percent carboxystearic acid as determined by GLC and representing a conversion yield of 98.9 percent based on the oleic acid in the starting material. Example 27 was repeated under the same conditions except that the pot distillation residue was used directly without having been oxidized with nitric acid. The crude product obtained after a reaction period of 12 hours contained only 28.9 percent carboxystearic acid as determined by GLC and representing a conversion yield of only 34.2 percent. When Example 27 was repeated again under the same conditions, but without hydrochloric acid being used, the product obtained after 6 hours showed a conversion yield to carboxystearic acid of only 10.9 percent.

EXAMPLE 28

A 300-ml. autoclave was charged with 32 g. of distilled safflower fatty acids containing 6.3 percent palmitic acid, 1.9 percent stearic acid, 13.2 percent oleic acid, and 78.6 percent linoleic acid as determined by GLC. To this charge was added 0.091 g. palladium chloride, 0.523 g. triphenylphosphine, 4.00 g. distilled water, and 63 ml. of acetone. The autoclave was sealed, purged 3 times, and pressurized with carbon monoxide to 2500 p.s.i.g. The magnetic stirrer was started and heat was applied. After 30 minutes the temperature reached 139° C. and the pressure 4000 p.s.i.g. The temperature and pressure were controlled at 140° ± 1° C. and 4000 p.s.i.g. for 4 hours. During this period two samples were taken for analysis. At the end of the reaction period, the autoclave and contents were cooled to room temperature and the gases were vented. The contents were filtered by the same procedure as described in Example 1. The filtered crude product weighed 37.8 g. The following composition was obtained by GLC: 5.9 percent palmitic acid, 2.1 percent stearic acid, 1.1 percent unsaturated fatty acids, 29.7 percent carboxystearic acid plus carboxyoleic acid, and 61.0 percent dicarboxystearic acid, a 98.8 percent conversion yield.

EXAMPLE 29

A 300-ml. autoclave was charged with 100 g. of distilled linseed oil fatty acids of the following composition determined by GLC: 6.9 percent palmitic acid, 3.6 percent stearic acid, 21.8 percent oleic acid, 24.2 percent linoleic acid, and 43.6 percent linolenic acid. The catalyst used consisted of a mixture of 0.674 g. palladium chloride and 3.99 g. triphenylphosphine. To this mixture was added 13.45 g. distilled water and 50 ml. acetone. The autoclave was sealed, purged 3 times, and pressurized with carbon monoxide to 3000 p.s.i.g. The stirrer was started and heat was applied. After 18 minutes the temperature reached 150° C. and the pressure 4125 p.s.i.g. The temperature and pressure was controlled at 150° ±1° C. for 6 hours. During this period two samples were taken to follow the progress of the reaction. The pressure varied from 3875 to 4000 p.s.i.g. After the reaction period the autoclave and contents were cooled to room temperature and the gases vented. The contents were filtered as described in Example 1. The crude product weighed 106.2 g. and had the following composition determined by GLC: 6.4 percent palmitic acid, 5.3 percent stearic acid, 9.5 percent unsaturated fatty acids, 41.8 percent mixture of carboxyoleic acid ply carboxylinoleic acid plus carboxystearic acid, 26.1 percent mixture of dicarboxyoleic acid and dicarboxystearic acid, and 10.8 percent tricarboxystearic acid, a conversion yield of 89.0 percent.

EXAMPLE 30

A 300-ml. autoclave was charged with 75 g. linseed oil having the following composition determined by GLC on the methyl esters: 6.3 percent palmitate, 3.3 percent stearate, 22.0 percent oleate, 15.1 percent linoleate, and 53.3 percent linolenate. The catalyst consisting of 0.507 g. palladium chloride, 2.99 g. triphenylphosphine was added together with 11.40 g. water and 75 ml. acetone. The autoclave was sealed, purged three times with carbon monoxide, and then pressurized with the same gas to 3000 p.s.i.g. Magnetic stirring was begun and heat was applied. After 17 minutes the temperature reached 150° C. and the pressure increased to 4175 p.s.i.g. The temperature was controlled at 150° ± 2° C. for 3 hours and during this period the pressure was decreased to 3750–3900 and restored 6 times to 4000 p.s.i.g. The autoclave and contents were cooled to room temperature and the gases were vented. The contents were removed and filtered to give a crude product weighing 84.3 g. The final product was analyzed by GLC after conversion of triglycerides to methyl esters by saponification and methylation and gave the following composition: 5.2 percent palmitate, 4.2 percent stearate, 1.4 percent unsaturated esters, 33.1 percent carboxyoleate plus carboxylinoleate plus carboxystearate, 26.8 percent dicarboxyoleate plus dicarboxystearate, and 29.5 percent tricarboxystearate, a conversion yield of 98.9 percent.

I claim:

1. A process for reactivating a spent hydrocarboxylation catalyst contained in the distillation pot residue from the distillation of carboxylated products from the reaction of unsaturated fatty compounds from the group consisting of mono- and polyunsaturated fatty acids, fatty acid alkyl esters, and triglyceride vegetable oils with carbon monoxide at pressures of from about 3000 to 4500 p.s.i.g. and a 10 to 100 mole percent excess of a stoichiometric amount of water in the presence of a catalytic amount of palladium chloride admixed with a trisubstituted phosphine from the group consisting of triphenylphosphine and trialkylphosphines in molar ratios of from 1:2 to 1:4 palladium chloride:trisubstituted phosphine, at temperatures of from about 100° to 160° C. for a period of time sufficient to produce carboxylated products in conversion yield of from 86 to 99 percent, said carboxylated products being distilled at temperatures of from about 135° to 220° C. and at pressures of from 0.02 to 0.01 mm. of mercury in such a manner that from 93 to 95 percent by weight of said reaction products are removed and the carboxylated products being characterized as having substantially all of the added carboxyl groups attached to one of the originally unsaturated carbon atoms in said unsaturated fatty compounds; comprising the steps of:

a. oxidizing the distillation pot residue with concentrated nitric acid;

b. mixing the oxidized distillation pot residue with water at 0° C.;

c. extracting the mixture resulting from step (b) with diethyl ether;

d. neutralizing the diethyl ether solution resulting from step (c);

e. drying the neutralized diethyl ether solution resulting from step (d);

f. removing the diethyl ether from the dried, neutralized diethyl ether solution resulting from step (e); and g. admixing the oxidized distillation pot residue product of step (f) with said trisubstituted phosphine and hydrogen chloride in weight ratios of from 1:0.2:0.02 to 1:3:0.06 oxidized residue product:trisubstituted phosphine:hydrogen chloride.

* * * * *